(12) United States Patent
Van der Linde et al.

(10) Patent No.: US 8,091,650 B2
(45) Date of Patent: Jan. 10, 2012

(54) POWER TOOL GUARD

(75) Inventors: Benjamin Luke Van der Linde, Narre Warren South (AU); Paul Francis Conner, Elwood (AU); David Leigh Scrimshaw, Beaumaris (AU)

(73) Assignee: Demain Technology Pty Ltd., Victoria (AU)

( * ) Notice: Subject to any disclaimer, the term of this patent is extended or adjusted under 35 U.S.C. 154(b) by 297 days.

(21) Appl. No.: 12/294,132

(22) PCT Filed: Mar. 23, 2007

(86) PCT No.: PCT/AU2007/000371
§ 371 (c)(1), (2), (4) Date: Dec. 22, 2008

(87) PCT Pub. No.: WO2007/106952
PCT Pub. Date: Sep. 27, 2007

(65) Prior Publication Data
US 2009/0114410 A1   May 7, 2009

(30) Foreign Application Priority Data

Mar. 23, 2006  (AU) .............................. 2006901500

(51) Int. Cl.
*B25B 28/00* (2006.01)
(52) U.S. Cl. ............. 173/20; 173/171; 173/18; 173/170
(58) Field of Classification Search .................... 173/20, 173/171, 18, 170, 221
See application file for complete search history.

(56) References Cited

U.S. PATENT DOCUMENTS

| 1,119,276 | A | * | 12/1914 | Griffith et al. | .................. 279/75 |
| 3,596,525 | A | * | 8/1971 | Niesz | ................................. 74/57 |
| 3,783,955 | A | * | 1/1974 | Gill | ................................. 173/50 |
| 4,250,971 | A | * | 2/1981 | Reibetanz et al. | .............. 173/21 |

(Continued)

FOREIGN PATENT DOCUMENTS

DE         2604348 A1      8/1977

(Continued)

OTHER PUBLICATIONS

Office Action mailed Jun. 8, 2010 in U.S. Appl. No. 12/064,507.

(Continued)

*Primary Examiner* — Brian D Nash
(74) *Attorney, Agent, or Firm* — Baker & Daniels LLP

(57) ABSTRACT

A power tool including a power tool body, a rotatable driven member being operable for releasably gripping a working element and having a front end and a rear end, the driven member extending from the rear end, located proximally and connected to the power tool body, and terminating at the front end. The power tool has a drive mode in which rotation of the driven member drives the working element relative to the power tool body and an adjustment mode in which rotation of the driven member causes the driven member to either grip the working element or release the working element or both. The power tool also includes a guard extending over the driven member from the power tool body and terminating adjacent to the front end of the driven member, wherein at least in the power tool drive mode the front end of driven member does not extend beyond the guard. In another aspect the guard has a surface for gripping the power tool between the front end of the driven member and the power tool body.

19 Claims, 8 Drawing Sheets

U.S. PATENT DOCUMENTS

| | | | |
|---|---|---|---|
| 4,389,146 A | 6/1983 | Coder | |
| 4,524,896 A | 6/1985 | Morrell, Jr. | |
| 4,664,394 A | 5/1987 | Theissig et al. | |
| 4,834,192 A | 5/1989 | Hansson | |
| 4,858,230 A | 8/1989 | Duggan | |
| 4,892,013 A | 1/1990 | Satoh | |
| 5,110,145 A * | 5/1992 | Stewart | 279/24 |
| 5,135,241 A * | 8/1992 | Huff et al. | 279/142 |
| 5,195,760 A | 3/1993 | Wheeler et al. | |
| 5,277,527 A | 1/1994 | Yokota et al. | |
| 5,284,217 A | 2/1994 | Eshghy | |
| 5,409,243 A | 4/1995 | Shadeck et al. | |
| 5,553,675 A * | 9/1996 | Pitzen et al. | 173/217 |
| 5,657,417 A | 8/1997 | Di Troia | |
| 5,685,549 A | 11/1997 | Yang | |
| 6,045,303 A | 4/2000 | Chung | |
| 6,062,114 A | 5/2000 | Rahm | |
| 6,502,836 B1 * | 1/2003 | Marriott | 279/61 |
| 6,516,896 B1 | 2/2003 | Bookshar et al. | |
| 6,536,536 B1 | 3/2003 | Gass et al. | |
| 6,598,684 B2 | 7/2003 | Watanabe | |
| 6,687,567 B2 | 2/2004 | Watanabe | |
| 6,834,730 B2 | 12/2004 | Gass et al. | |
| 6,836,614 B2 | 12/2004 | Gilmore | |
| 6,860,342 B1 * | 3/2005 | Wu et al. | 173/217 |
| 6,892,827 B2 | 5/2005 | Tyoama et al. | |
| 6,913,087 B1 | 7/2005 | Brotto et al. | |
| 6,945,337 B2 | 9/2005 | Kawai et al. | |
| 7,036,703 B2 | 5/2006 | Grazioli et al. | |
| 7,124,839 B2 | 10/2006 | Furuta et al. | |
| 7,410,006 B2 | 8/2008 | Zhang et al. | |
| 7,410,007 B2 | 8/2008 | Chung et al. | |
| 7,806,199 B2 * | 10/2010 | Pohl et al. | 173/48 |
| 2003/0196824 A1 | 10/2003 | Gass et al. | |
| 2005/0155778 A1 * | 7/2005 | Ishida et al. | 173/217 |
| 2006/0186612 A1 | 8/2006 | Puzio | |
| 2007/0193759 A1 * | 8/2007 | Sweig et al. | 173/198 |
| 2009/0016834 A1 | 1/2009 | Scrimshaw et al. | |
| 2009/0200053 A1 | 8/2009 | Scrimshaw et al. | |

FOREIGN PATENT DOCUMENTS

| | | |
|---|---|---|
| DE | 3418882 A1 | 11/1985 |
| DE | 29813077 U1 | 10/1998 |
| DE | 10334619 A1 | 2/2005 |
| GB | 2405114 A | 2/2005 |
| WO | WO02/058893 A1 | 8/2002 |

OTHER PUBLICATIONS

Response (Amendment) filed Sep. 3, 2010 in U.S. Appl. No. 12/064,507.
Notice of Allowance mailed Nov. 26, 2010 in U.S. Appl. No. 12/064,507.
Office Action mailed Mar. 31, 2010 in U.S. Appl. No. 12/064,251.
Response (Amendment) filed Aug. 31, 2010 in U.S. Appl. No. 12/064,251.
Office Action mailed Nov. 9, 2010 in U.S. Appl. No. 12/064,251.

* cited by examiner

POWER TOOL GUARD

CROSS-REFERENCE TO RELATED APPLICATIONS

This is a U.S. National Phase Patent Application based on International Patent Application Serial No. PCT/AU2007/000371 filed on Mar. 23, 2007, the disclosure of which is expressly incorporated by reference herein.

FIELD OF THE INVENTION

This invention relates to power tools of the type incorporating a driven member adapted to releasably grip at least one working element. The invention is applicable to tools in which the working element is a drill bit, a saw blade, a cutting wheel, a grinding wheel, or any other element used to cut, shape, or otherwise treat a work piece, or is a driving element such as a screwdriver blade, or a socket spanner.

A power drill is one form of power tool to which the invention is applicable. For the sake of convenience the invention is described below in the context of power drills, but it is to be understood that the invention has broader application.

BACKGROUND OF THE INVENTION

Existing power drills usually have a three jaw chuck for gripping a drill bit. The chuck jaws are adjustable to suit drill bits of various sizes. In most cases such adjustment is carried out by use of a key or by manually twisting the outer sleeve of the chuck or alternatively the user grips the outer sleeve and power is applied to the chuck, whereby the user provides a resistance force.

In such arrangements, however, when the chuck jaws are gripping and driving a drill bit into a work piece the jaws may come into contact with the work piece and damage it. In addition, the chuck, including the chuck jaws, may be exposed to damage and the ingress of dust into moving parts within the chuck.

Further drawbacks associated with the above arrangements include that the closest a user can grip the drill body is behind the rearmost part of the chuck some distance away from the drill bit and the work piece. Furthermore, it is possible that a user may, when using the drill, get hair, clothing or body parts caught in the chuck or the chuck jaws.

Existing drill arrangements have incorporated a light source for providing light in the work area. Such arrangements include a light source located on the main body of the drill and rearward of the chuck. Thus, the light source is located a distance from a work surface that results in a relatively low intensity light on the work surface and requires adjusting the focus point of the light in the area in which work is to be carried out. Also, if the chuck is located between the light and the work surface then when the light is in use the chuck can cast a shadow on the work surface.

SUMMARY OF THE INVENTION

The present invention ameliorates the problems set out above with respect to existing power tool arrangements by providing, in a first aspect, a power tool including:
  a power tool body;
  a rotatable driven member being operable for releasably gripping a working element and having a front end and a rear end, the driven member extending from the rear end, located proximally and connected to the power tool body, and terminating at the front end;
  the power tool having a drive mode in which rotation of the driven member drives the working element relative to the power tool body and an adjustment mode in which rotation of the driven member causes the driven member to either grip the working element or release the working element or both;
  a guard extending over the driven member from the power tool body and terminating adjacent to the front end of the driven member, wherein at least in the power tool drive mode the front end of driven member does not extend beyond the guard.

This aspect of the present invention is advantageous in that it provides a power tool, an example of which is a power drill, that has a driven member, which in the case of a power drill may be a chuck, that is operable for gripping and releasing a working element by rotation of the driven member, which in the case of a power drill means activating a motor that drives rotation of the chuck, when the driven member is in the adjustment mode. This aspect of the invention also provides, in combination with the above, a guard that can protect the driven member and can protect a user from the driven member when it rotates. The guard can also provide an additional gripping surface forward of the body of the power tool and adjacent the driven member.

Preferably, the guard has a surface for gripping the power tool between the front end of the driven member and the power tool body. More preferably, the gripping surface is at least partially formed out of a resilient material. In one form, a majority of the gripping surface is formed out of a resilient material, whereas, in another form, a minority of the gripping surface is formed out of a resilient material. These forms of the invention are advantageous in that they enable a user to hold the power tool much closer to the working element than has previously been possible with existing power tools employing a driven member for releasably gripping at least one working element and having a working mode for driving movement of the working element relative to the power tool body. They may also assist in providing a more sure grip and/or damping of vibration transmitted to the user's hand.

In a preferred form, the invention may include a resilient member mounted to the guard adjacent the front end of the driven member, wherein at least in the power tool drive mode the front end of driven member does not extend beyond the resilient member for preventing the guard from leaving an impression on a work piece. In another form, the resilient member may be mounted to the guard adjacent and forward of the front end of the driven member. These forms of the invention may prevent the driven member from directly contacting a work-piece for the working element, however, they may also prevent the guard from leaving an impression on the work piece and leaving an unsightly mark. These embodiments are particularly beneficial where, for example, the work-piece is a piece of relatively soft material such as softwood and where the use of existing power tool arrangements pose a risk that the driven member will come into contact with the soft material and abrade or leave a divot in the soft material.

In one form, the guard is rotatable relative to the body of the power tool for adjusting the amount of torque supplied to the driven member. Preferably, the amount of torque supplied to the driven member is adjusted by a torque controller that is actuable to different torque settings by the rotation of the guard. In another preferred form, the torque controller is a mechanical torque controller.

In another form, the guard includes a graduated indicator for different amounts of torque. Alternatively, the body includes a graduated indicator for different amounts of torque.

In another form the guard is substantially axially aligned with an axis of the driven member that drives movement of the working element by substantially moving relative to the axis. Preferably, the guard is substantially cylindrical and tapers from a larger diameter at the power tool body and to a smaller diameter adjacent the front end of the driven member. In these forms of the invention, the user may grip the power tool by holding the guard any position about the periphery of the working element.

Preferably, the guard is integral with the power tool. In another form the guard is detachable from the power tool body to reveal the driven member.

In another form, the power tool of the invention may further include a light source mounted to the guard adjacent the front end of the driven member. In another form, the light source is detachable from the guard. The light source may be used to provide light on a work area for the working element. This arrangement is advantageous over existing power tools that incorporate a light source or have a light source attached, whereby the position or orientation of the light source must be adjusted to focus the light in the area where work is to be carried out by the working element. By providing a light source adjacent the front end of the driven member, which is the closest part of the power tool to the work area, this embodiment of the invention obviates the need to adjust the position or orientation of the light source to focus on the work area.

In another form, the power tool of the invention further includes a bearing mounted between the guard and the driven member forward of the rear end of the driven member. The bearing may be any type of bearing such as a ball bearing type bearing. Alternatively, the power tool of the invention may include a bush or a contact surface between the guard and the driven member. The advantage of these arrangements is that the driven member is supported forward of the rear end of the driven member whereas in existing arrangements, the driven member is only supported behind the rear end of the driven member, some distance away from the working element which is subject to forces in various directions arising from contact with, and work being conducted, on the work-piece.

In a particularly preferred form of the invention, the power tool is a power drill and the driven member is a chuck with gripping jaws adapted to grip the working element in the form of a drill bit.

In another aspect, the present invention provides a power tool including:

a power tool body;

a rotatable driven member being operable for releasably gripping a working element and having a front end and a rear end, the driven member extending from the rear end, located proximally and connected to the power tool body, and terminating at the front end;

the power tool having a drive mode in which rotation of the driven member drives the working element relative to the power tool body and an adjustment mode in which the driven member either grips the working element or releases the working element or both;

a guard extending over the driven member from the power tool body, terminating adjacent the front end of the driven member and having a surface for gripping the power tool between the front end of the driven member and the power tool body, wherein at least in the power tool drive mode the front end of driven member does not extend beyond the guard.

In a preferred form, the gripping surface is at least partially formed out of a resilient material, preferably a resilient polymer. In another form the gripping surface is shaped to provide additional grip.

BRIEF DESCRIPTION OF THE FIGURES

The present invention will now be described in more detail with reference to the following Figures. The following Figures represent embodiments of the invention in the form of a hand held power drill and for the sake of convenience the present invention is described below in detail with reference to the power drill embodiment. It is to be appreciated, however, that the present invention may be suitable for use with various other forms of power tool such as, without limitation, hand held power saws, power screw-drivers, power percussion/hammer drills and any other power tool that utilises a driven member that releasably grips and drives movement of a working element relative to the power tool body.

DETAILED DESCRIPTION

Figure 1:
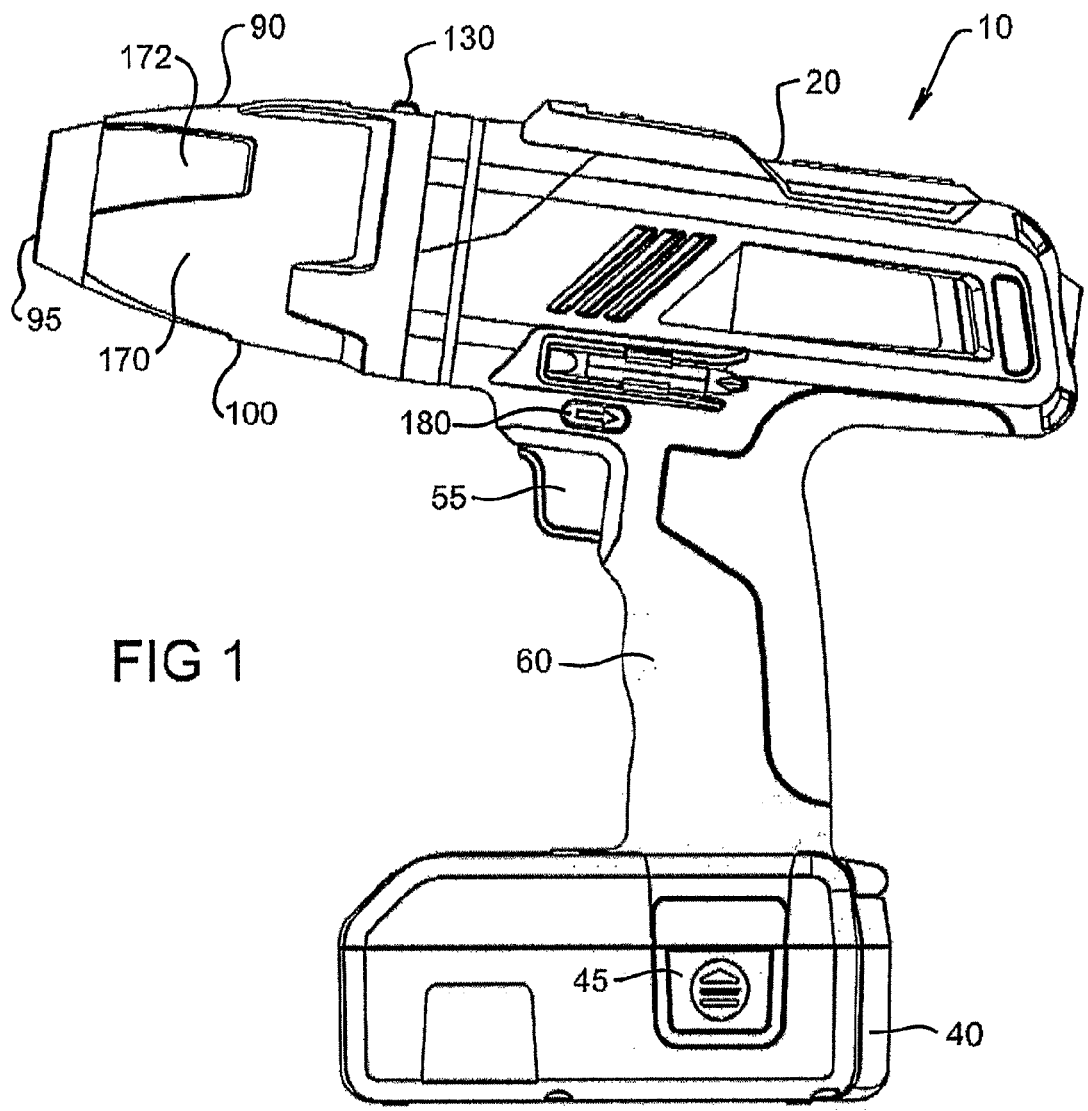
FIG. 1 illustrates in diagrammatic form a hand held power drill in accordance with a preferred embodiment of the invention that includes a power tool body and a mechanical driven member that is obscured by a guard extending from the front of the power tool body.

FIGS. 1 to 8 illustrate a preferred embodiment of the invention in the form of a hand held power drill 10, however, the invention is applicable to other power tools that may or may not be hand held or portable. The power drill 10 includes a power drill body 20 integrally formed with a pistol grip handle 60 for gripping the power drill 10. While the arrangement of the handle 60 illustrated in the drawings is in the form of a pistol grip that is moulded to the shape of a user's hand, that is, the grip includes depressions to receive the fingers of a user, it is to be appreciated that other shapes and configurations of handle 60 may be employed. The body 20 of the power drill 10 has a generally cylindrical shape and encases components of the power drill 10 such as a motor 30. Incorporated into the handle 60 adjacent to the body 20 of the power drill 10 are a switch 50 and a trigger 55 for actuating the switch 50. Also incorporated into the handle 60 but distally from the body 20 of the power drill 10 is a battery 40 and a battery retaining and releasing means 45 that enables convenient replacement of the battery 40 as required. In another form, not illustrated, the power drill 10 may exclude the use of the battery 40 and may instead have a power lead extending from the handle 60, or any other suitable location, that connects to a mains power outlet to supply power to the power drill 10.

The power drill 10 also includes a driven member 70 having an axis of rotation. A rear end 75 of the driven member 70 is connected to the motor 30. The driven member 70 extends from the rear end 75 and terminates at a front end 80 of the driven member 70. Operation of the motor 30 causes the driven member 70 to rotate in either forward or reverse directions.

In the particular arrangement shown, the driven member 70 is a three jaw chuck arrangement that includes a head portion 76 at the front end 80 having a plurality of jaws 85, 86 mounted to the head portion 76 in an angular orientation relative to the axis of the driven member 70. Each jaw 85, 86 has a gripping face 87, 88 adapted to clamp against the shank of a working element such as a drill or screwdriver bit 155. Adjustment means are provided to enable the jaws 85, 86 to move as required to adjust to the diameter of the shank of the bit 155 to be gripped.

Each jaw 85, 86 is slidably mounted to the head portion 76 of the driven member 70 so as to be movable relative to the head portion 76 on a path that is angularly displaced relative to the axis of the driven member 70. The adjusting means includes an adjusting nut 72 that meshes with each jaw 85, 86 through a thread or worm connection. The arrangement of the adjusting means is such that rotation of the driven member 70 including the head portion 76 of the driven member 70 and the jaws 85, 86, caused by operation of the motor 30, relative to the adjusting nut 72 causes the gripping face 87, 88 of each jaw 85, 86 to move towards or away from the axis of the driven member 70 while simultaneously projecting each jaw 85, 86 outwardly or retracting each jaw 85, 86 inwardly relative to the head portion 76 of the driven member 70.

When a drill or screwdriver bit 155 is to be inserted between the jaws 85, 86 for gripping by the gripping face 87, 88 of each jaw 85, 86, the driven member 70 is adjusted by operating the motor in one direction of rotation so that the head portion 76 and the jaws 85, 86 rotate relative to the adjustment nut 72 such that each jaw 85, 86 moves away from the axis of the driven member 70 and retracts inwardly relative to the head portion 76 of the driven member 70. The shank of the bit 155 is inserted between the jaws 85, 86. The driven member 70 is adjusted again by operating the motor in the reverse direction of rotating so that the head portion 76 and the jaws 85, 86 also rotate in the reverse direction relative to the adjustment nut 72 and each jaw 85, 86 moves towards the axis of the driven member 70 and projects outwardly relative to the head portion 76 of the driven member 70 to clamp the bit 155 between the gripping face 87, 88 of each jaw 85, 86.

As is shown in FIGS. 1 to 8 a guard 90 extends from the power drill body 20 adjacent the rear end 75 of the driven member 70. The guard 90 extends from the power drill body 20 over the driven member 70 and terminates at a front end 95 of the guard 90 adjacent the front end 80 of the driven member 70. The guard 90 may be integral with the body 20 of the power drill 10 and is substantially cylindrical and tapers from a larger diameter at the body 20 of the power drill 10 to a smaller diameter opening at the front end 95 of the guard 90 adjacent the front end 80 of the driven member 70. The guard 90 is also substantially axially aligned with the axis of rotation of the driven member 70. Although the guard 90 illustrated in the drawings is substantially cylindrical and tapers from a large diameter to a smaller diameter opening, such that it has a conical shape, it is to be appreciated that the guard 90 may have other shapes and be equally suitable for its purpose. For example, the guard 90 may have a substantially cube or rectangular prism shape. In this form, the guard 90 would include four interconnected sides extending from the body 20 of the power drill 10 that may taper, or not taper, to a square shaped opening at the front end 95 of the guard 90. In these forms, the guard 90 would have a substantially square cross section. Other forms of the guard 90 could include a hexagonal or octagonal cross section or any other form of cross section and may include tapering or no tapering and may include sides that are interconnected at sharp edges or rounded edges. Alternatively, the guard 90 may be shaped to conform to a user's hand. In this form, the guard 90 may include depressions for receiving the fingers of a user to provide enhanced comfort and grip.

The guard 90 illustrated in FIGS. 1 to 8 can be gripped by a user and rotated about an axis of the guard 90 relative to the body 20 of the power drill 10. As is particularly shown in FIGS. 2, 3 and 4, the guard 90 is coupled to a torque control means 185 for controlling the amount of torque transmitted from the motor 30 to the driven member 70. When the guard 90 is rotated in one direction it adjusts the torque control means 185 to reduce the maximum amount of torque that the motor can impart to the driven member 70. On the other hand, when the guard 70 is rotated in the reverse direction it adjusts the torque control means 185 to increase the maximum amount of torque transmitted from the motor 30 to the driven member 70. The guard incorporates a graduated indicator for when different torque settings for the torque control means 185 have been selected. Alternatively, the body 20 may include a graduated indicator for when different torque settings for the torque control means 185 have been selected.

Figure 5:
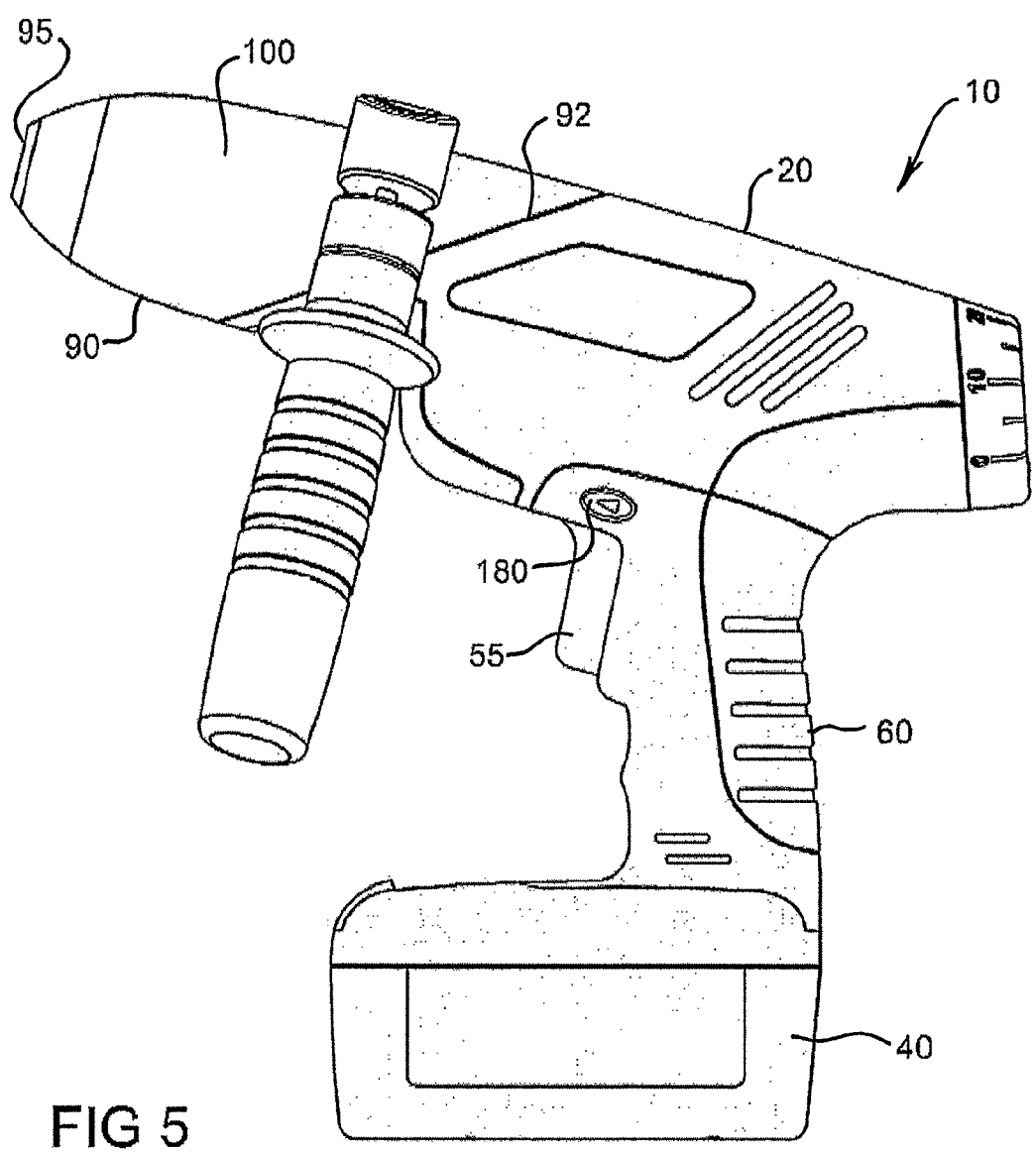
FIG. 5 illustrates in diagrammatic form a hand held power drill in accordance with a preferred embodiment of the invention that includes a power tool body and an electronic driven member that is obscured by a guard extending from the front of the power tool body.

In another form, as illustrated in FIG. 5 in particular, the guard 90 may not be integral with the body 20 of the power drill 10 along a joint 92 to reveal and enable access to the driven member 70 and its three jaw chuck arrangement including the head portion 76, the plurality of jaws 85, 86, the rear end 75 of the driven member coupled to the motor 30 and any other component of the power drill 10 located between the motor 30 and the front end 80 of the driven member 70. The means of connection of the guard 90 and body 20 may take any suitable form including, for example, a twist and lock arrangement or a snap lock arrangement.

As is shown in FIGS. 2, 3, 4, 6, 7 and 8 the guard 90 is shown terminating adjacent and level with each jaw 85, 86 when the gripping faces 87, 88 of the jaws 85, 86 are in contact with each other and the jaws 85, 86 are in their forward most position relative to the head portion 76 of the driven member 70 and relative to the guard 90. In order for a bit 155 to be placed between the gripping faces 87, 88 the driven member 70 must be adjusted by rotating the head portion 76 of the driven member 70 relative to the adjustment nut 72 such that each jaw 85, 86 moves angularly away from the axis of the driven member 70 and retracts inwardly relative to the head portion 76 of the driven member 70 to provide a space between the gripping faces 87, 88 for receiving the bit. Accordingly, when the driven member 70 has been so adjusted each jaw 85, 86, which form the front end 80 of the driven member 70, is rearward of the front end 95 of the guard 90 such that the front end 80 of the driven member 70 will be located substantially inside the guard 90.

When the driven member 70 is subsequently further adjusted by rotating the head portion 76 in the opposite direction relative to the adjustment nut 72 such that each jaw 85, 86 moves angularly toward the axis of the driven member 70 and projects outwardly relative to the head portion 76 to close the space between the gripping faces 87, 88 for clamping the bit between the jaws 85, 86, the jaws 85, 86, which form the front end 80 of the driven member 70, remain rearward of the front end 95 of the guard 90 such that the front end 80 of the driven member 70 will remain located substantially inside the guard 90.

When the power drill 10 is in use, a drill or screwdriver bit 155 gripped between the jaws 86 of the driven member 70 and initially is placed in contact with a work piece 160. A forefinger of a user's hand gripping the handle 60 then activates the power drill 10 by depressing a trigger 55 on the handle 60. Depressing the trigger 55 actuates the switch 50 inside the handle 60 that enables current to flow from the battery 40 to the motor 30. The motor 30, which is connected to the rear end 75 of the driven member 70, subsequently drives rotation of the driven member 70 to, in turn, drive rotating movement of the drill or screwdriver bit 155 for boring or driving a screw into the work-piece 160 of timber, masonry or the like. Thus, the power drill 10 has a drive mode in which current flowing from the battery 40 to the motor 30 drives rotating movement of the driven member 70 that, in turn, drives rotating movement of the drill or screwdriver bit 155 relative to the body 20 of the power drill 10.

Accordingly, when the power drill 10 is in the drive mode in which the driven member 70 drives movement of the drill or screwdriver bit 155 relative to the body 20 of the power drill 10 the front end 80 of the driven member 70 does not extend beyond the front end 95 of the guard 90. Accordingly, in the case where the working element is a drill bit 155, when the drill bit 155 bores a hole into a work-piece 160 such as a piece of timber the front end 95 of the guard 90 is the only part of the power drill 10 that will be able to come into contact with the work-piece 160 apart from the drill bit 155 itself. This prevents the jaws 85, 86 at the front end 80 of the driven member 70, which will be rotating when the power drill 10 is in the drive mode, from directly contacting and abrading or otherwise marking the work-piece 160. Another advantage is that when the power tool 10 is in the drive mode the guard 90 substantially guards the rotating parts of the driven member 70, such as the jaws 85, 86, against a user's hair and/or clothing or the like from coming into contact and getting caught in the rotating parts of the driven member 70 such as the jaws or any other part of the driven member 70.

The guard 90 may be formed of any suitable material, but is preferably formed of a substantially rigid material such as plastic, metal or the like. The guard 90 may be a solid, uniform substantially cylindrical member or it may have apertures in it or be formed of a number of elongate members extending from the body 20 of the power drill 10 arranged to form a non-complete cylinder type arrangement. Any arrangement of the guard 90 that meets the criteria set out for the guard 90 of the invention should be considered to fall within the scope of the invention.

In another form, the guard 90 may include a resilient member such as a piece of rubber in the form of a ring mounted on the round front end 95 of the guard 90. The resilient member is mounted to the front end 95 of the guard 90 for preventing the jaws 85, 86 comprising the front end 80 of the driven member 70, which will be rotating when the power drill 10 is in the drive mode, from directly contacting a work-piece 160 for the working element 155 and from leaving an impression or other unwanted mark on the work piece. The resilient member may be mounted to the guard 90 adjacent the front end 80 of the driven member 70, such that at least in the drive mode the front end 80 of driven member 70 does not extend beyond the resilient member, the resilient member may be mounted to the guard 90 adjacent and forward of the front end 80 of the driven member 70. The resilient member is particularly beneficial where, for example, the work-piece 160 is a piece of relatively soft material such as soft-wood and where the hard metallic jaws 85, 86, which will be rotating when the power drill 10 is in the drive mode, pose a risk of coming into contact with the soft material and abrading or leaving a divot in the soft material. The resilient member is also particularly beneficial in preventing the guard 90, which may be relatively hard, from coming into direct contact with the work-piece 160 and causing damage such as leaving a divot or depression, particularly where the work-piece 160 is relatively soft material such as soft-wood or other like soft material As is shown in FIGS. 1 and 5, the guard 90 includes a gripping surface 100 extending from the body 20 of the power drill 10 to the front end 95 of the guard 90 adjacent the front end 80 of the of the driven member 70. The gripping surface 100 enables a user to grip the power drill 10 by not only the handle 60 but also the guard 90. Accordingly, a user can grip the power drill 10 forward of the rear end 75 of the driven member 70 and/or forward of the body 20 of the power drill 10 when the power drill 10 is in the drive mode. As such, a user can hold the power drill much closer to the working element 155 than has previously been possible with existing power tools such as power drills.

As illustrated in FIGS. 1 to 4 and 8 the gripping surface 100 of the guard 90 may include a resilient portion 170 and a non-resilient portion 172. The resilient portion 170 of the gripping surface 100 may be formed out of a resilient material such as a soft, spongy polymer, rubber or other like material so as to provide additional grip when a user is gripping the gripping surface 100. Another advantage of the resilient portion 170 of the gripping surface 100 is that it may have shock absorption properties that insulate the users hand from vibration from the power tool. It is to be appreciated, however, that the resilient portion 170 may be substituted by a textured or shaped surface or material which provides additional grip for a user.

Figure 4:
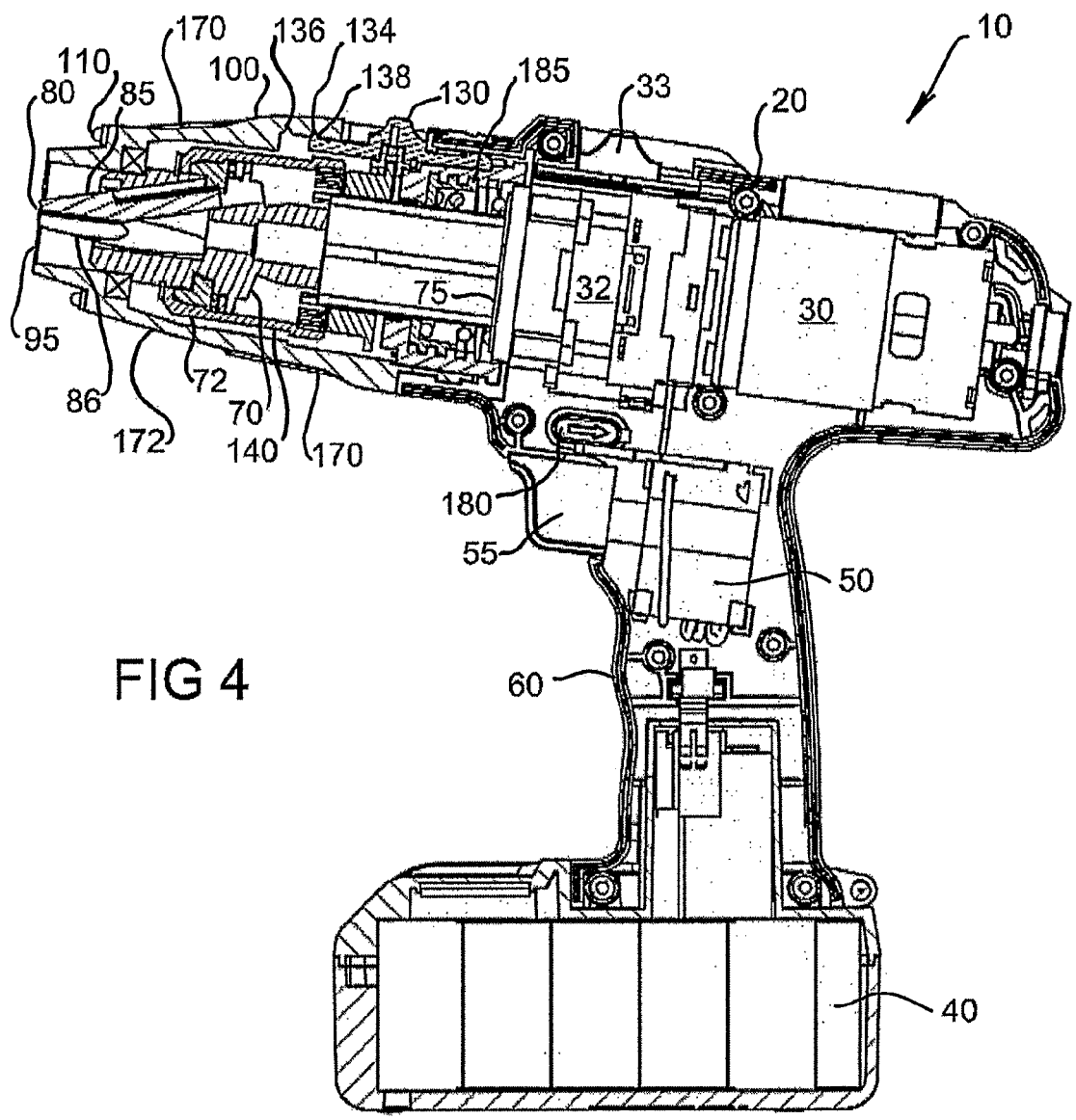
FIG. 4 is a schematic illustration of the embodiment of the power drill of FIG. 3 further including a light source mounted to the guard.
Figure 7:
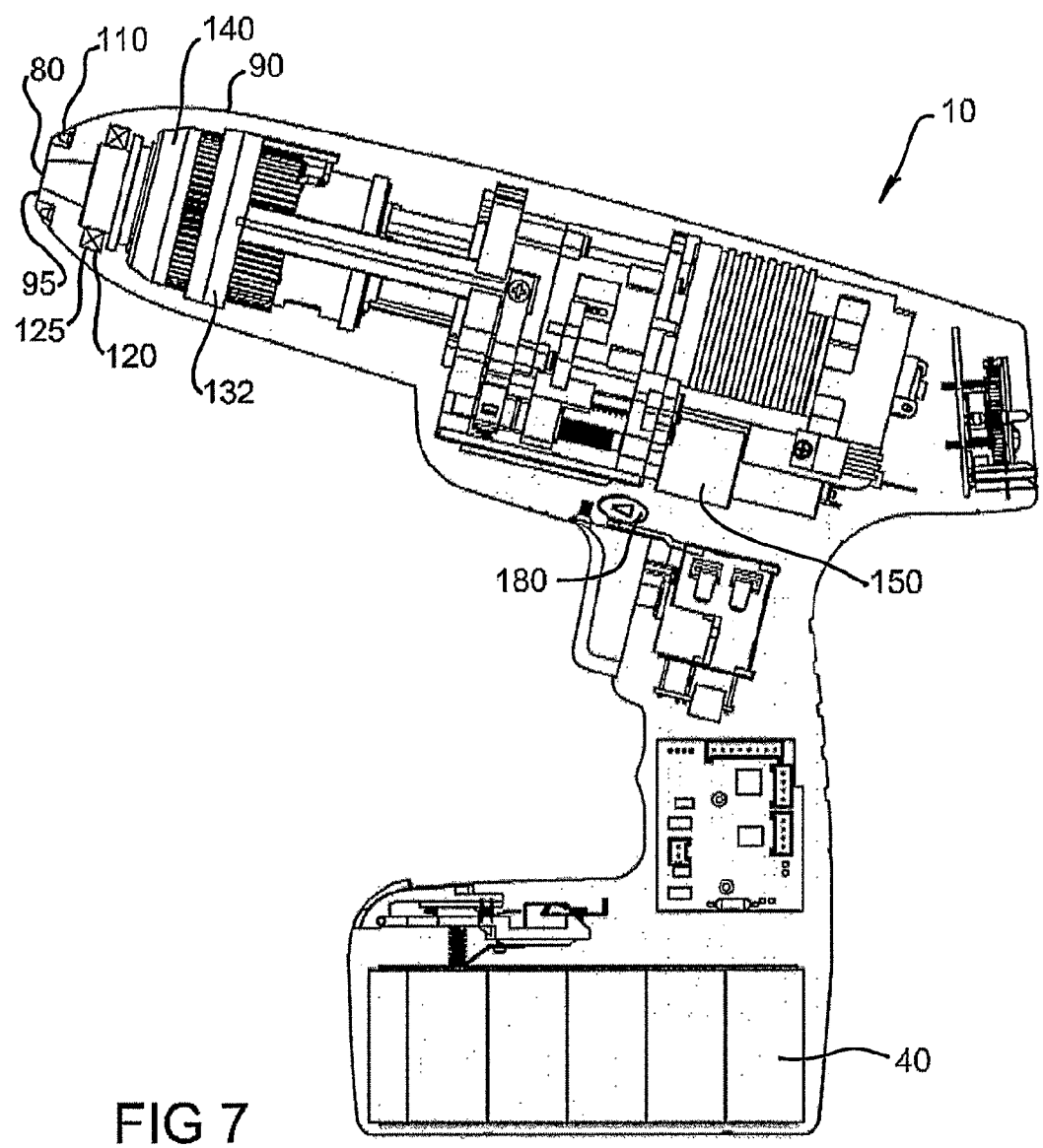
FIG. 7 is a schematic illustration of the embodiment of the power drill of FIG. 6 further including a bearing mounted between the guard and the driven member and a light source mounted to the guard.
Figure 8:
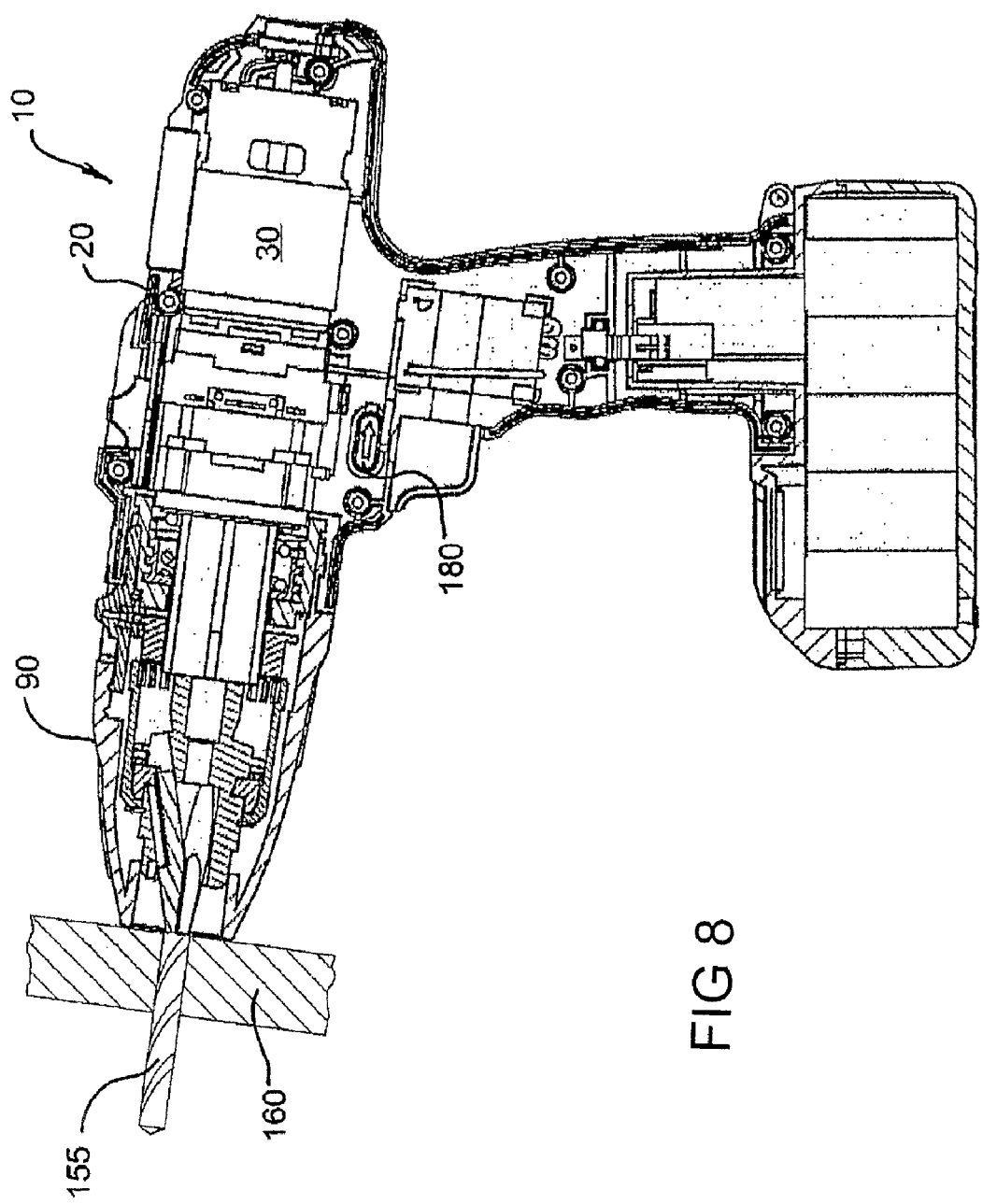
FIG. 8 is a schematic illustration of the power drill of FIG. 1 including a working element in the form of a drill bit boring through a work-piece illustrating the way in which the guard prevents the driven member from contacting the work-piece when the power drill is in the drive mode.

In FIGS. 4 and 7 the power drill 10 includes a light source 110 mounted to the guard 90 near the front end 95 of guard 90 and adjacent the driven member 70. The light source 110 is in a circuit with the battery 40 and is operable for providing light in an area of a work-piece 160 where the working element 155, such as a drill or screwdriver bit, will carry out work. In yet another form in which the power drill 10 is a mains powered drill and not a battery powered drill, the light source 110 may be in circuit with the mains power supply and supplied with power therefrom. In another form, the light source 110 may be detachably mounted to the front end 95 of the guard 90 or any other part of the guard 90 between the front end 95 and the tool body 20. The detachable light source 110 may include its own battery or other form of power supply such that the detachable light source need not be in circuit with the battery 40 or a mains power supply to the power drill 10.

Figure 3:
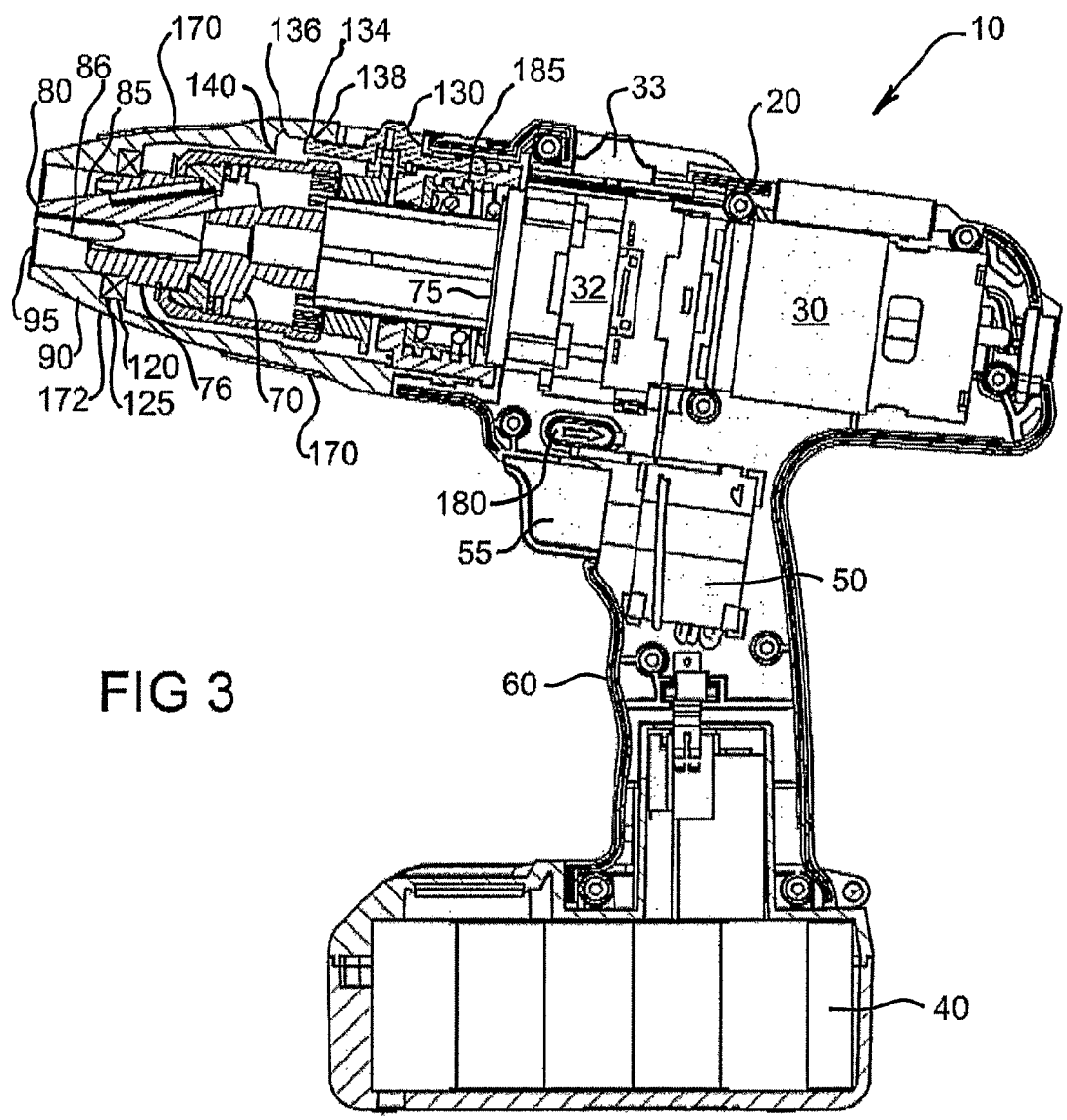
FIG. 3 is a schematic illustration of the embodiment of the power drill of FIG. 2 further including a bearing mounted between the guard and the driven member.

In FIGS. 3, 4 and 7 the power drill 10 is also provided with a bearing 120 mounted between an inner circumferential surface 125 of the guard 90 and the head portion 76 of the driven member 70. The bearing 120 may be any type of bearing such as a ball bearing type bearing. Alternatively, the bearing 120 may be a bushing or may simply be replaced by contacting the inner circumferential surface 125 of the guard 90 directly to the head portion 76 of the driven member 70. The advantage of these arrangements is that the driven member 70 is supported forward of the rear end 75 of the driven member 70 whereas in existing arrangements, the driven member 70 is only supported behind the rear end 75 of the driven member 70, some distance away from the working element 155 which is subject to forces in various directions arising from contact with, and work being conducted, on the work-piece 160.

In FIGS. 1 to 4 the power drill 10 shown includes a mechanical adjustment means that includes a toggle 130 connected to a locking ring 132. The toggle 130 is movable between a drive mode position corresponding to the drive mode of power drill 10 and an adjustment mode position in which the driven member 70 is adjustable for gripping and releasing a drill or screwdriver bit. In the adjusting position the toggle 130 is located relatively forward and a protrusion 134 connected to the toggle 130 engages a forward recess 136 within the guard 90. The locking ring 132, which is also connected to the toggle 130, is also located relatively forward and engages and locks an adjustment sleeve 140 which in turn locks the adjusting nut 72 to prevent it from rotating relative to the head portion 76. Forward or reverse rotation of the driven member 70 caused by forward or reverse rotation of the motor 30 causes co action between the jaws 85, 86, the head portion 76 and the adjusting nut 72 such that the position of the jaws 85, 86 is adjusted inwards or outwards according to the direction of the rotation of the driven member 70 and of the motor 30. Accordingly, in the preferred embodiment in the driven member 70 is a chuck, forward and reverse rotation of the chuck resulting from forward and reverse rotation of the motor 30 causes the jaws 85, 86 to adjust inwards and outwards when the power tool 10 is in the adjustment mode as determined by the position of the toggle 130.

The toggle 130 is also movable to the drive mode position in which the toggle 130 is located relatively rearward and the protrusion 134 connected to the toggle 130 engages a rearward recess 138 within the guard 90. The locking ring 132, which is connected to the toggle 130, is also located relatively rearward and disengages and unlocks the adjustment sleeve 140 which in turn unlocks the adjusting nut 72 relative to the head portion 76 to enable the adjusting nut 72 to rotate when the driven member 70 rotates. The advantage of this form of the invention is that a user can conveniently adjust the driven member 70 to grip and release a drill or screwdriver bit by simply moving the toggle 130 forwards or rearwards and activating the motor 30 of the power drill 10 in either the forward or reverse direction. This arrangement also enables the user to adjust the driven member 70 with the driven member 70 substantially enclosed by the guard 90. The power drill 10 also includes a forward/reverse switch 180 that is can be manipulated by a user to cause the motor 30 to rotate in either the forward or reverse direction when the user activates the switch 55. The forward/reverse switch 180 can achieve this by various suitable ways including by being able to reverse the flow of current from the battery 40 to the motor 30.

Figure 6:
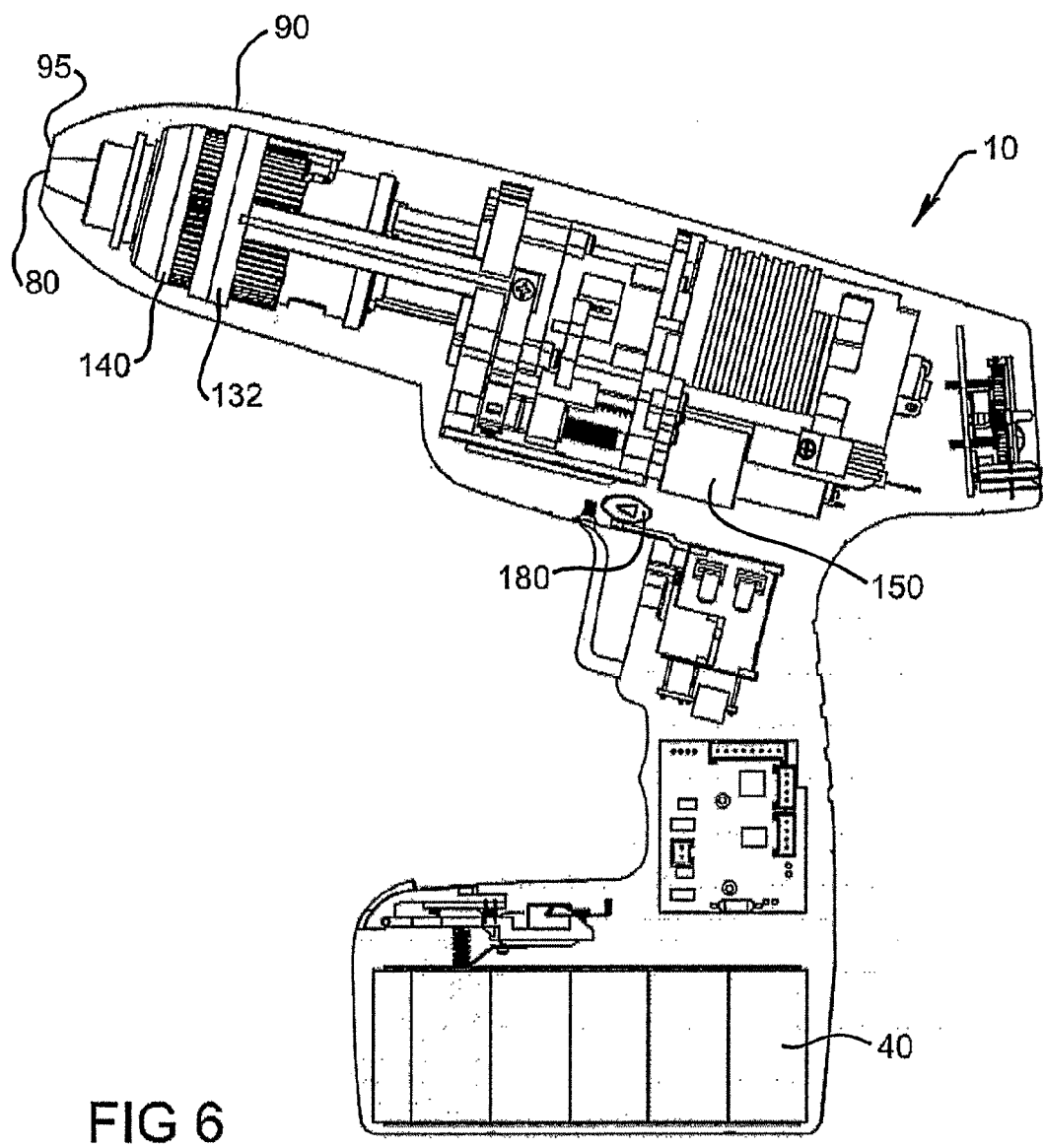
FIG. 6 is a schematic illustration of the power drill of FIG. 5 illustrating some internal features of the power drill including the electronic driven member connected to the power tool body that is operable for releasably gripping and driving a working element.

An electronic form of the adjustment means is shown in FIGS. 5 to 7 in which instead of utilising a mechanical arrangement between the toggle 130 and the adjusting nut 72 for locking and unlocking the adjusting nut 72 relative to the head portion 76 the power drill 10 utilises an electronic actuator 150 to move the locking ring 132 forward and rearward for engaging and disengaging the adjustment sleeve 140 and, in turn, locking and unlocking the adjusting nut 72 such that it remains stationary relative to the head portion 76 which is rotatable under the action of the drive means for respectively providing the adjustment mode and drive mode for the power drill 10.

Figure 2:
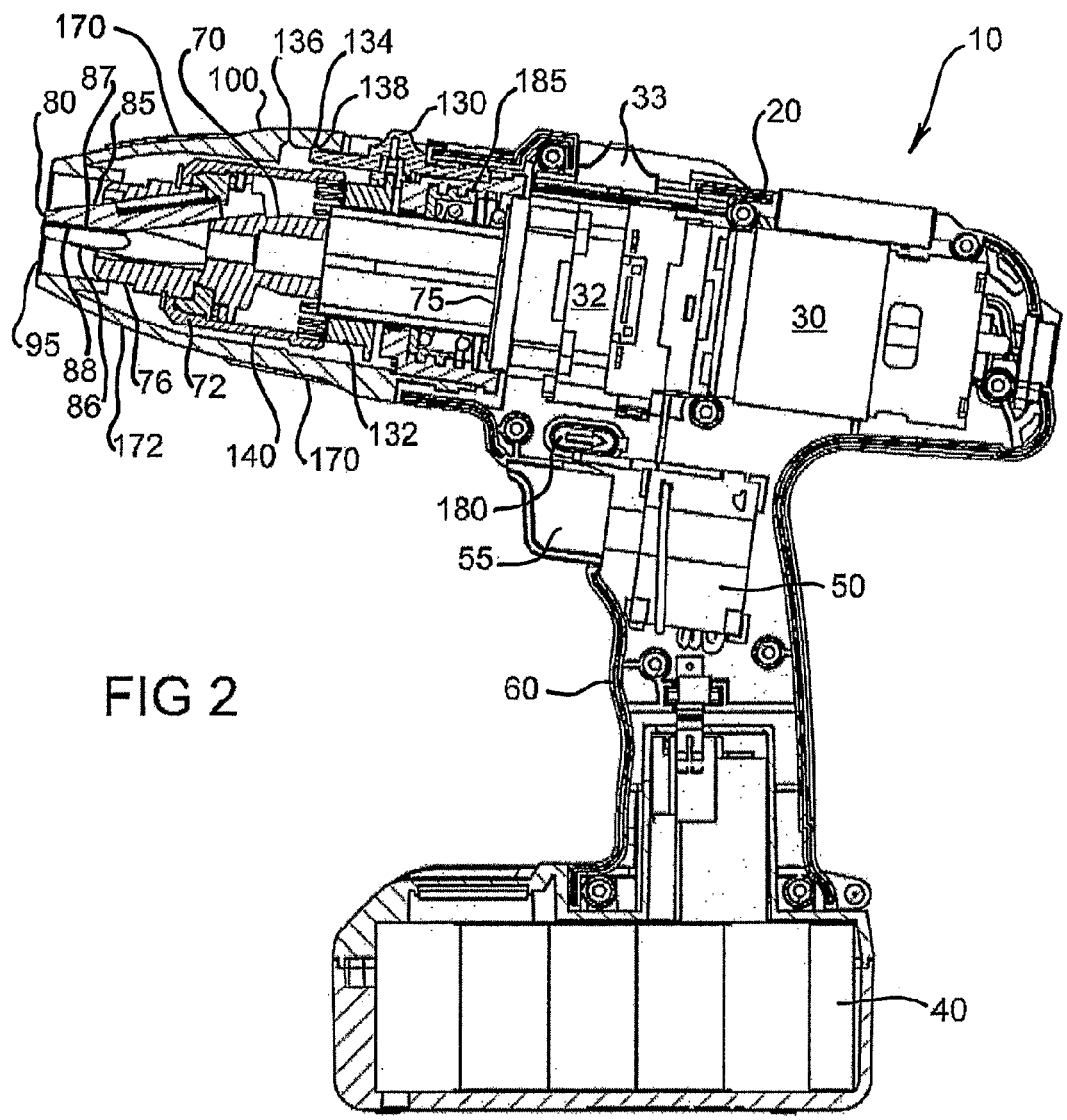
FIG. 2 is a schematic illustration of the power drill of FIG. 1 illustrating some internal features of the power drill including the mechanical driven member connected to the power tool body that is operable for releasably gripping and driving a working element.

The power drill 10 may also include, as indicated in FIGS. 2 to 4, a gearbox 32 between the motor 30 and the drive means 70. The gearbox 32 includes more than one setting for the relative speed of rotation of the driven member 70 relative to the speed of rotation of the motor 30. The power tool 10 also includes a sliding switch 33 connected to the gearbox 32 for adjusting the gearbox 32 into its various settings.

It will be apparent from the foregoing description that a power tool 10 incorporating the invention prevents the driven member 70 of the power tool 10 from directly contacting a work-piece 160 for the working element 155 and substantially guards against a user's hair and clothing from contacting the front end of the driven member 70 when the power tool 10 is in the drive mode. A power tool 10 incorporating the invention also provides a reliable and effective means by which rotation of the driven member or chuck can on the one hand drive the working element relative to the power tool body and on the other hand cause the driven member to either grip the working element or release the working element or both. The power tool 10 also advantageously provides a gripping surface forward of the rear end 75 of the driven member 70.

Finally it is to be understood that various alterations, modifications and/or additions may be introduced into the constructions and arrangements of the parts previously described without departing from the spirit or ambit of the invention.

The claims defining the invention are as follows:

1. A power tool including:
   a power tool body;
   a rotatable driven member being operable for releasably gripping a working element and having a front end and a rear end, the driven member extending from the rear end, located proximally and connected to the power tool body, and terminating at the front end;
   the power tool having a drive mode in which rotation of the driven member drives the working element relative to the power tool body and an adjustment mode in which rotation of the driven member causes the driven member to either grip the working element or release the working element or both;
   a guard connected to the power tool body extending over the driven member from the power tool body and terminating adjacent to the front end of the driven member, wherein at least in the power tool drive mode the driven member rotates independently of the guard, the front end of the driven member does not extend beyond the guard and the guard can be gripped by a user when the power tool is operated in the drive mode.

2. The power tool of claim 1, wherein the guard has a surface for gripping the power tool between the front end of the driven member and the power tool body.

3. The power tool of claim 2, wherein the gripping surface is at least partially formed out of a resilient material.

4. The power tool of claim 3, wherein a majority of the gripping surface is formed out of a resilient material.

5. The power tool of claim 3, wherein the resilient material is a soft material.

6. The power tool of claim 1, wherein the guard terminates adjacent and forward of the front end of the driven member in the power tool drive mode.

7. The power tool of claim 1, further including a resilient member mounted to the guard adjacent the front end of the driven member, wherein at least in the power tool drive mode the front end of the driven member does not extend beyond the resilient member for preventing the guard from leaving an impression on a work piece.

8. The power tool of claim 7, wherein the resilient member is mounted to the guard adjacent and forward of the front end of the driven member.

9. The power tool of claim 1, wherein the driven member drives movement of the working element by substantially moving relative to an axis of the driven member and the guard is substantially axially aligned with the axis of the driven member.

10. The power tool of claim 1, wherein the guard is rotatable relative to the body of the power tool for adjusting the amount of torque supplied to the driven member.

11. The power tool of claim 10, wherein the amount of torque supplied to the driven member is adjusted by a torque controller that is actuable to different torque settings by the rotation of the guard.

12. The power tool of claim 11, wherein the torque controller is a mechanical torque controller.

13. The power tool of claim 10, wherein the guard includes a graduated indicator for different amounts of torque.

14. The power tool of claim 10, wherein the body includes a graduated indicator for different amounts of torque.

15. The power tool of claim 1, wherein the guard is substantially cylindrical and tapers from a larger diameter at the power tool body and to a smaller diameter opening adjacent the front end of the driven member.

16. The power tool of claim 1, wherein the guard is integral with the power tool body.

17. The power tool of claim 1, wherein the guard is detachable from the power tool body to reveal the driven member.

18. The power tool of claim 1, further including a light source mounted to the guard adjacent the front end of the driven member for providing light on a work area for the working element.

19. The power tool of claim 18, wherein the light source is detachable from the guard.

* * * * *